United States Patent [19]

Johnson

[11] 4,430,676
[45] Feb. 7, 1984

[54] CONTROL APPARATUS FOR SELECTIVELY RECORDING SIGNALS

[76] Inventor: Michael K. Johnson, 5314 Franklin Ave., Apt. No. 5, Hollywood, Calif. 90027

[21] Appl. No.: 373,632

[22] Filed: Apr. 30, 1982

Related U.S. Application Data

[63] Continuation of Ser. No. 134,525, Mar. 27, 1980, abandoned.

[51] Int. Cl.³ .............................................. G11B 27/08
[52] U.S. Cl. ...................................... 360/13; 360/69; 358/908; 358/335
[58] Field of Search ............... 360/13, 69, 71, 33.1, 360/74.1, 14.1, 14.2, 14.3; 369/47, 50, 48, 19; 358/908, 165, 188, 335, 310, 311; 455/230, 231; 179/1 MN, 1 VC

[56] References Cited

U.S. PATENT DOCUMENTS

| 2,424,216 | 7/1947 | Atkins | 179/1 VC |
|---|---|---|---|
| 2,630,525 | 3/1953 | Tomberlin et al. | 369/19 X |
| 3,628,153 | 12/1971 | Fukata | 358/908 X |
| 4,283,735 | 8/1981 | Jagger | 358/908 X |
| 4,305,101 | 12/1981 | Yarbrough et al. | 358/908 X |

Primary Examiner—Bernard Konick
Assistant Examiner—Donald McElheny, Jr.
Attorney, Agent, or Firm—Phillips, Moore, Lempio & Finley

[57] ABSTRACT

Control apparatus for recording first wanted signals of an input signal having the first signals and second unwanted signals, each of the second signals being of a time duration up to a predetermined maximum and each of the first signals being of any time duration greater than the predetermined maximum, including a circuit, responsive to the input signal, for automatically distinguishing the first signals from the second signals as a function of time duration, and a circuit for producing recorder control signals to record each of the first signals and to prevent recording of the second signals.

10 Claims, 3 Drawing Figures

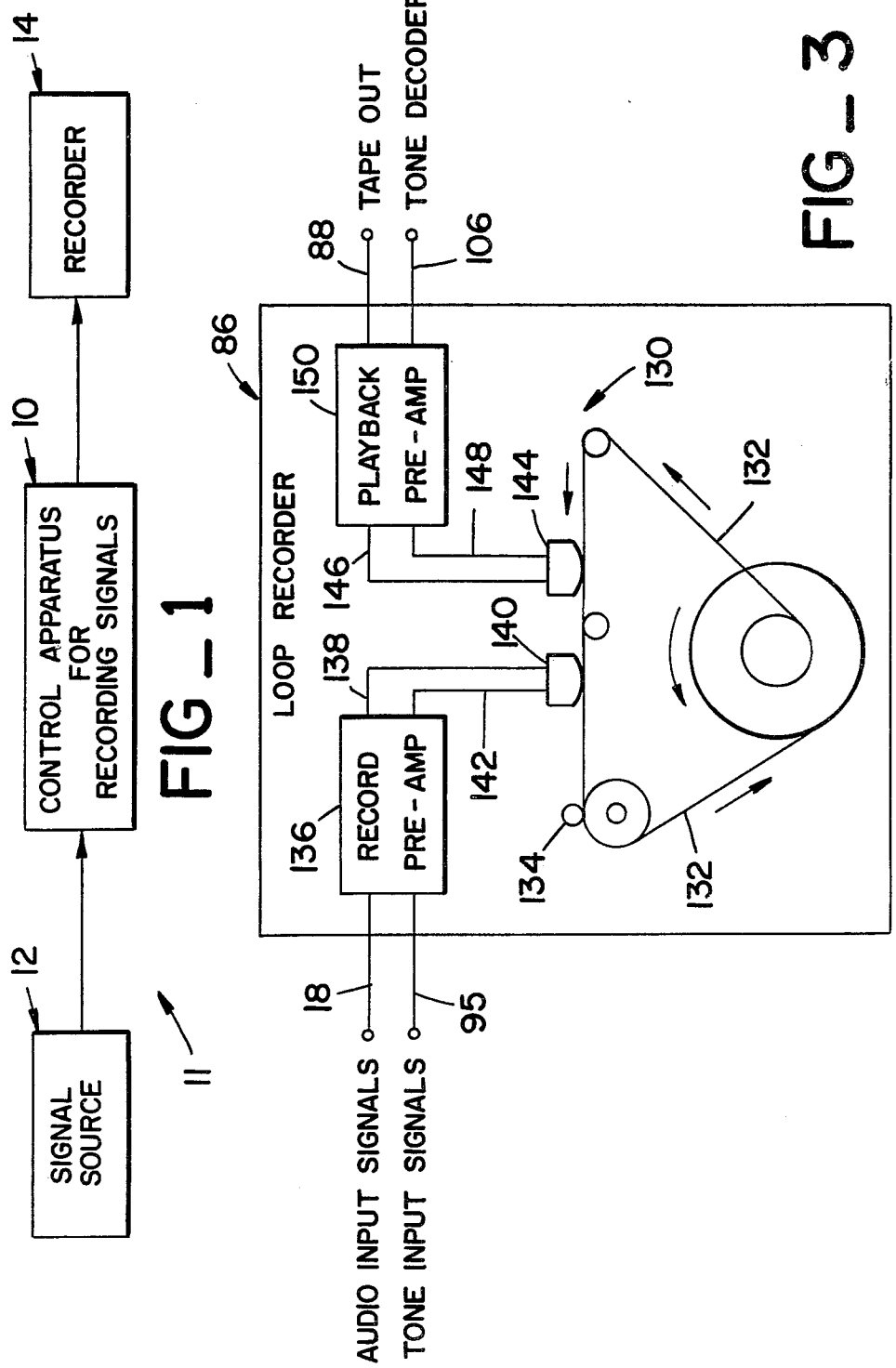

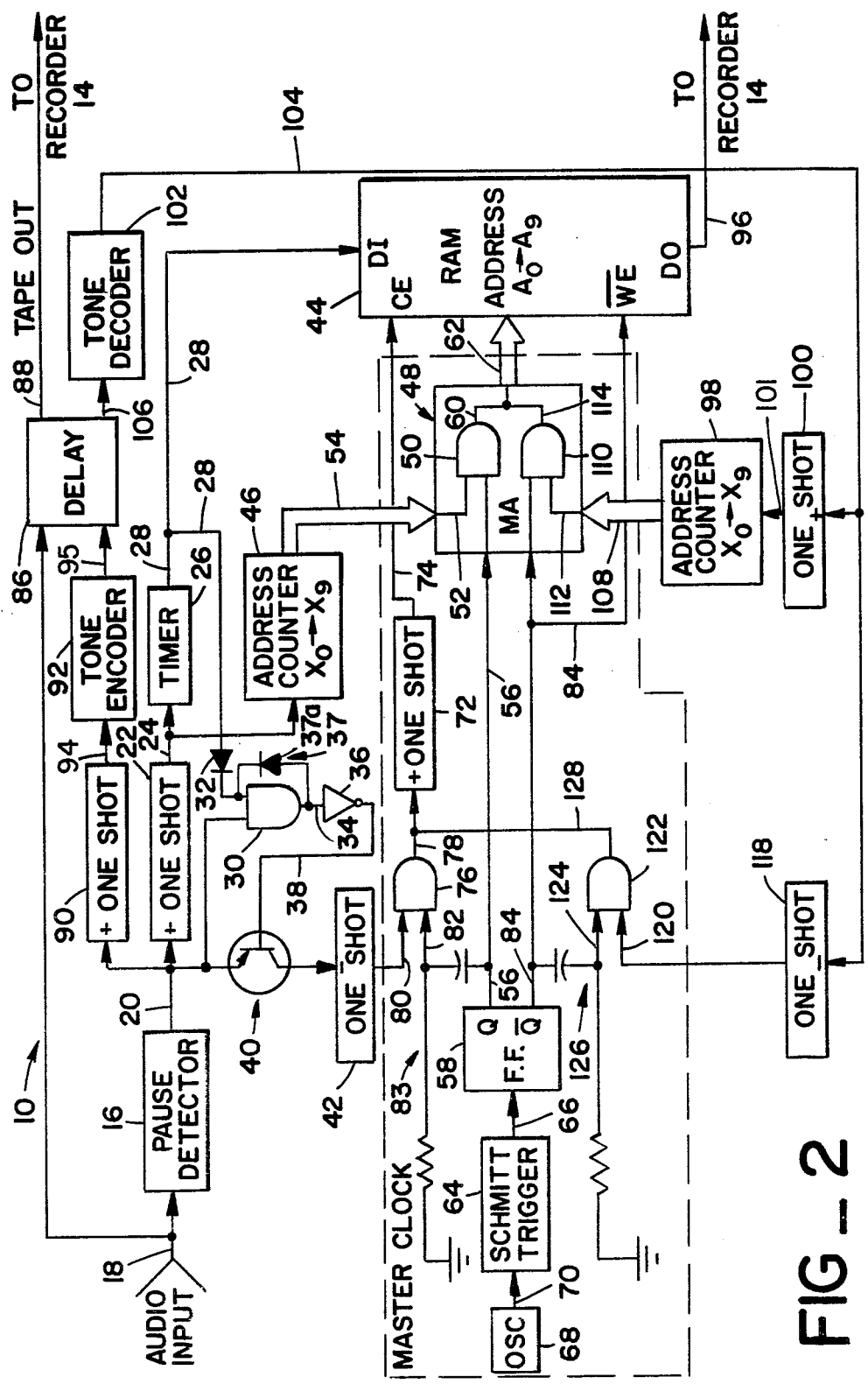
FIG_2

CONTROL APPARATUS FOR SELECTIVELY RECORDING SIGNALS

This is a continuation, of Ser. No. 134,525, filed Mar. 27, 1980, abandoned.

TECHNICAL FIELD

This invention relates generally to apparatus for recording signals and more particularly to control apparatus for selectively recording only desired or wanted signals.

BACKGROUND ART

In the radio broadcasting field, during the course of a given program the radio station will broadcast music interspersed with commercials. Typically, a number of records of varying duration will be played, with commercials being broadcast between each record. A recording of the entire program can be made on an audio tape using a conventional tape recorder.

Not too surprisingly, it is often desirable to record the program without commercial interruption. That is, tape recordings are made which have only the music being broadcast of each record of any duration, but which do not have the commercials. Typically, this is accomplished by a person listening to a radio broadcast and manually turning the tape recorder on and off when music or commercials are being played.

A number of problems exist with this manual technique for recording only music of any duration directly on to the tape recorder. First, this technique requires the constant attention of the person recording the music being broadcast in turning the tape recorder on and off. Secondly, the person must anticipate the beginning and ending of each piece of music and each commercial to operate the tape recorder so as not to eliminate any of the desired music or to record the undesired commercials. Thirdly, under some conditions it may not be practical to make such a commercial-free recording. For example, while driving an automobile, the person should not be concentrating on turning on and off a cassette to record the music of a program being received over the car radio.

The present invention is directed to overcoming one or more of the problems as set forth above.

DISCLOSURE OF THE INVENTION

In one aspect of the present invention apparatus is provided for recording first signals of an input signal having the first signals and second signals, each of the second signals being of a time duration up to a predetermined maximum and each of the first signals being of any time duration greater than the predetermined maximum, comprising means, responsive to the input signal, for distinguishing the first signals from the second signals as a function of time duration, and means, connected to said distinguishing means, for producing recorder control signals to record each of the first signals and to prevent recording of the second signals.

With prior techniques, a tape recorder must be manually and continually monitored to record only the desired audio signals such as music and not to record the undesired audio signals such as commercials. Also, because the person making the recording must anticipate the beginning and ending of the music and commercials, it is not unlikely that a portion of the desired signals will not be recorded and a portion of the undesired signals will be recorded. The present invention automatically distinguishes between the first and second signals so as to be able to record all of the desired first signals and none of the second signals. Manual operation of the tape recorder is not required, nor is the constant monitoring and attention of the person making the recording. Also, with the present invention such a recording can be conveniently made in any location such as while driving an automobile.

BRIEF DESCRIPTION OF THE DRAWINGS

FIG. 1 is a block diagram of a recording system having the present invention.

FIG. 2 is a schematic illustration of an embodiment of the present invention.

FIG. 3 is a pictorial view of a signal delay used in the embodiment of FIG. 2.

BEST MODE FOR CARRYING OUT THE INVENTION

FIG. 1 discloses control apparatus 10 of a system 11 for recording certain signals from a signal source 12 onto a recorder 14. The control apparatus 10 receives all the signals from source 12, decides which of the received signals are the desired or wanted signals to be recorded, and controls the recorder 14 to record only the wanted signals. Control apparatus 10 automatically and directly makes a recording of only the wanted signals on recorder 14 from the signals of the signal source 12. That is, the control apparatus 10 is an automatic signal editor which need be only turned on, whereby a recording of only wanted signals will be made.

While the invention will be discussed in relation to the recording of audio signals, it has applicability also to the recording of video signals. Thus, signal source 12 can be a radio station broadcasting audio signals, and recorder 14 can be an audio tape recorder, but the signal source 12 could be a TV station broadcasting video signals and recorder 14 could be a video tape recorder.

As shown in FIG. 2, control apparatus 10 includes a pause detector 16 that receives audio input signals from the source 12 over an input line 18 to detect the presence or absence of these signals. When a signal is present on the input line 18, the output pulse of the detector 16 on a line 20 goes high at the start of this signal and remains high until the signal on line 18 terminates, at which time the output pulse on line 20 goes low. Thus, the output pulse on line 20 has a duration which is coextensive with the input signal on line 18. An example of a pause detector is given in a paper entitled "Signal Detector Operates From 5-volt Supply" by D. K. Smith, Electronics, Mar. 30, 1970, page 95.

A one-shot multivibrator 22 is triggered by the leading or rising edge of the pulse on line 20 to produce a pulse on an output line 24 corresponding to the start of each audio input signal on line 18. A timer 26, such as a counter with a running clock, is reset by the pulse on line 24 to count for a predetermined duration t. As an example, and for the reasons given below, this duration t is equal to 60 seconds. Prior to the end of this duration t, the timer 26 produces logic 0 on an output line 28, while at the end of duration t, the output on line 28 switches to a logic 1 for a brief interval. Thereafter, the timer 26 is not reset until a new pulse is received on line 24, at which time the output on line 28 is logic 0 again.

An AND-gate 30 has one input connected to the line 28 from the timer 26 via a diode 32 and another input connected to the line 20 from the pause detector 16. The output of gate 30 is produced over a line 34 as the input to an inverter 36. A feedback loop 37 having a diode 37a is connected from the output of gate 30 on line 34 to the input of gate 30 on line 28.

Inverter 36 produces an output on a line 38 which is coupled to the base of a transistor 40. Transistor 40 has its emitter coupled to the line 20 and its collector coupled to the triggering input of a one-shot multivibrator 42 which is triggered at the trailing or negative going edge of a pulse.

The multivibrator 42 is triggered at the end of duration t, i.e., at the end of the 60 second interval, should the audio input signal on line 18 be longer or shorter than 60 seconds. More particularly, assume that the audio input signal on line 18 is longer than 60 seconds. At the start of this signal and up to the end of this 60-second interval, one input to the gate 30 on line 20 will be high or logic 1 from the output pulse of pause detector 16 and the other input to the gate 30 on line 28 will be logic 0. Consequently, the output of gate 30 on line 34 is low, which is inverted by the inverter 36 to turn on the transistor 40 via the output line 38. Therefore, the output pulse on line 20 will be fed through the transistor 40 to the multivibrator 42 which waits for a trailing edge before it is triggered. At the end of the 60-second interval, the output of the timer 26 on line 28 briefly goes to the logic 1 state to enable gate 30 whose other input on line 20 is still logic 1. The output of gate 30 on line 34 now goes high, which is inverted by inverter 36 to turn off the transistor 40 via the line 38, whereby multivibrator 42 will be triggered by the trailing edge at its triggering input. It may be noted that at this time the output pulse on line 20 is still high since it follows the duration of the audio input signal on line 18 which is assumed to be longer than 60 seconds.

Also, the feedback loop 37 holds the input to gate 30 high, regardless of any further transitions of the timer 26 at output line 28 to prevent false triggering of the multivibrator 42. The gate 30 is kept in this state until the pulse on line 20 goes low, at which time gate 30 is cleared for a new audio signal on line 18.

Assume now that the audio input signal on line 18 has a duration which is less than 60 seconds. At the start of this input signal, the pulse on line 20 goes high as a logic 1 input to the gate 30, but the output on line 28 from the timer 26 is logic 0. Therefore, gate 30 is disabled, resulting in the turning on of transistor 40 as described above. Consequently, the pulse on line 20 is sent through the transistor 40 to the multivibrator 42. Since the transistor 40 is turned on during the 60 second interval, when the audio input signal on line 18 goes low prior to the end of this interval, the pulse on line 20 will go low, resulting in this trailing edge triggering the multivibrator 42.

A random access memory 44 stores data of the duration of each audio input signal on line 18. If the input signal has a duration greater than 60 seconds, a logic 1 data bit is stored in the memory 44 via a data input pin DI coupled to line 28. If the input signal on line 18 is less than 60 seconds, the memory 44 stores a logic 0 data bit via input pin DI.

To store this data, a 10-bit address counter 46 is incremented by 1 with each pulse on line 24 from the one-shot multivibrator 22. A single memory address logic circuit 48 is shown in FIG. 2 to address one space or location in memory 44 for storing one data bit; however, it is to be understood that this circuit 48 is repeated for each space in the memory 44 to store each data bit. Circuit 48 has an AND-gate 50 having one input 52 coupled to the output of the counter 46 over a line 54. Gate 50 has another input coupled over a line 56 to the output Q of a flip-flop 58. When enabled, gate 50 produces an output on a line 60 which is coupled to a line 62 to address the memory 44 at the space corresponding to the count in the address counter 46.

Flip-flop 58 is clocked by the output of a Schmitt trigger 64 over a line 66, whose input is connected to an oscillator 68 over a line 70. Thus, on alternate half cycles of the oscillator 68, the flip-flop 58 is clocked to produce a high on line 56 to enable the gate 50, and thereby, to address the memory 44.

Memory 44 has a chip enable pin CE coupled to the output of a one-shot multivibrator 72 over a line 74. An AND-gate 76 produces an output on a line 78 which is coupled to the triggering input of the multivibrator 72 to trigger the multivibrator 72 on the leading or rising edge of the output on line 78. Gate 76 has one input connected to the output of the multivibrator 42 over a line 80 and another input connected to the output Q of the flip-flop 58 via the line 56 and a line 82 through an RC network 83. Memory 44 also has a write enable input $\overline{WE}$ coupled to the output $\overline{Q}$ of the flip-flop 58 over a line 84.

In the operation of storing data in the memory 44, at the start of each input signal on line 18, the output pulse on line 20 from the pause detector 16 triggers the multivibrator 22 to increment the address counter 46 by 1. Thus, at this time, circuit 48 supplies an address to a location in memory 44. Then, assuming the input signal is longer than 60 seconds, at the end of duration t, the pulse on line 28 from the timer 26 switches to a logic 1 which is at the data input DI of the memory 44. Also, multivibrator 42 is triggered to send a pulse to gate 76 which will be enabled when the flip-flop 58 is clocked to produce an output Q or enabling pulse on the line 56 and line 82. Therefore, multivibrator 72 is triggered at this time by the output of gate 76 on line 78 to enable the memory 44. Simultaneously, the output $\overline{Q}$ on line 84 is low to produce the write enable pulse, whereby the logic 1 on line 28 at this time is stored at the addressed memory location.

If, on the other hand, the input signal on line 18 were less than 60 seconds, the multivibrator 42 will be triggered at the trailing edge of the pulse on line 20. As a result, gate 76 is enabled and multivibrator 72 triggered as described above to enable the memory 44 via line 74 and to produce the write enable pulse $\overline{WE}$ on line 84. At this time, however, since the input signal on line 18 is less than 60 seconds, the signal on line 28 is a logic 0 which is written into the memory 44 at the addressed location.

A delay 86 receives the audio input signals on line 18 and supplies these signals onto an output line 88 leading to the recorder 14 after a predetermined delay time. A one-shot multivibrator 90 is triggered by the leading edge of the pulse on line 20 corresponding to the start of each input signal on line 18 to trigger a tone encoder 92 over a line 94. The tone encoder 92 supplies a short pulse or marking signal of a given tone over a line 95 to the delay 86. This tone is processed in parallel with the start of each input signal being received by the delay 86 from the line 18 and indicates the start of each input signal.

The data stored in the memory 44 is read out via a data out DO port onto a line 96 to turn the recorder 14 on and off in the following manner. A 10-bit address counter 98 is incremented by 1 with each output pulse from a one-shot multivibrator 100 via a line 101. Multivibrator 100 is triggered at the leading edge of a pulse generated by a tone decoder 102 over a line 104. The tone decoder 102 detects the tone at the start of each signal from the delay 86 over a line 106 to produce the pulse on line 104. Address counter 98 produces its output over a line 108 to the memory address logic circuit 48.

An AND gate 110 of the logic circuit 48 has one input connected to the line 108 over a line 112 and another input connected to the output $\overline{Q}$ of the flip-flop over the line 84. The output of gate 110 is supplied over a line 114 to the line 62 to address the memory 44.

A one-shot multivibrator 118 is triggered by the trailing edge of the pulse on line 104 to generate a pulse on an output line 120 as one input to an AND-gate 122. The other input to the gate 122 is an enabling pulse on a line 124 coupled to the line 84 through an RC network 126 as shown. The output of gate 122 is produced on a line 128 to trigger the multivibrator 72.

In operation to read the data in memory 44, as the delayed signal is supplied on line 88 from the delay 86, the tone decoder 102 decodes the tone on line 106 to produce the pulse on line 104 at the start of each delayed signal. Multivibrator 100 is triggered on the leading edge of this pulse to increment the counter 98 to produce an address on line 108 which is coupled via the circuit 48 and line 62 to the memory 44 to address a location in the memory 44. At the trailing edge of the pulse on line 104, the multivibrator 118 is triggered to enable the gate 122 at the time the output $\overline{Q}$ of the flip-flop 58 on line 84 is high, which as already noted, occurs on alternate half cycles of the oscillator 68. Consequently, when gate 122 is enabled, the output on line 128 triggers multivibrator 72 to enable the memory 44 via the line 74. At this time also, the signal on line 84, being high, constitutes a read signal which is supplied via the write enable input $\overline{WE}$ of the memory 44 to read the data at the addressed location onto the line 96.

FIG. 3 shows one form of a delay 86 that can be used to delay all the input signals on line 18. The delay 86 constitutes a tape recorder 130 having a continuous looped record tape 132 that is driven by a motor drive 134 in a continuous loop in the direction shown. As will be further discussed below, the tape 132 has a loop time of, for example, two minutes before it repeats.

The audio input signals on line 18 are fed to a record preamplifier 136 which sends the amplified signals over a line 138 to a recording head 140 to record these signals on a track 1 of the tape 132. At the start of each of the input signals on line 18, the tone pulse on line 95 is also amplified by the preamplifier 136 and supplied over line 142 to the recording head 140 to record the tone pulse in parallel with the start on each audio signal on a track 2 of the tape 132. A playback head 144 plays back the recorded audio signals and tone pulses on tracks 1 and 2 of the tape 132 via respective lines 146 and 148. A playback preamplifier 150 amplifies these signals and supplies them, respectively, on the lines 88 and 106.

INDUSTRIAL APPLICABILITY

In the overall operation of the control apparatus 10 for recording signals, assume that a radio program of music and commercials is being broadcast and that this program is being received by a radio which is the signal source 12 shown in FIG. 1. To automatically make a recording on the recorder 14 of only the music, the control apparatus 10 only has to be switched on with a simple switch (not shown). When the control apparatus 10 is switched on, in a well-known manner the appropriate components such as counter 46 and counter 98 will be reset.

Assume also that when the control apparatus 10 is switched on, a piece of music such as a song of three minute's duration has just been received by the radio 12 and is being supplied as an audio input signal on the line 18. The pause detector 16 then produces a high pulse on line 20 at the start of this song, which remains high for the duration of the song.

Multivibrator 22 is then triggered to activate the timer 26 and increment the address counter 46 by one to address the memory 44 at a location 1 in accordance with the address supplied via the circuit 48. At the same time, the audio signal or song on input line 18 is recorded on the tape 132 of the delay 86, with the start of this signal being indicated by the tone pulse from the tone encoder 92 which is also recorded on the tape 132. At 60 seconds after the start of the song, the signal on line 28 switches to a logic 1, indicating that the input signal on line 18 is a desired signal to be recorded, and the multivibrator 42 is triggered since transistor 40 is now turned off. Then, when flip-flop 58 is switched to produce a high output Q on line 56, gate 76 is enabled to trigger the multivibrator 72 and enable the memory 44. Simultaneously, a write enable pulse is produced on line 84 from the output $\overline{Q}$ of flip-flop 58 and the logic 1 on line 28 at the data input DI is then written into the memory 44 at the address location 1.

After the two minute delay produced by delay 86, this song is fed over the output line 88 to the recorder 14. At the start of this delayed song, the tone decoder 102 detects the tone pulse on line 106 to produce a pulse on line 104, the leading edge of which triggers the multivibrator 100 to increment the address counter 98 by one. The address counter 98 now has an address to location 1 in memory 44 which is the same address produced by the address counter 46 to write in the logic 1. Then, at the trailing edge of the pulse on line 104, multivibrator 118 is triggered, resulting in gate 122 being enabled when flip-flop 58 is in a state providing a high output $\overline{Q}$ on the line 84. This high output $\overline{Q}$ on line 84 also enables gate 110 to address the memory 44 from counter 98 and is the read pulse to the write enable input $\overline{WE}$ of the memory 44. Multivibrator 72 also is triggered at this time by the output of the gate 122 on line 128 to enable the memory 44. Consequently, at the start of the delayed signal on line 88, a logic 1 is read from memory 44 onto the line 96, which is fed to the recorder 14 to turn on the recorder 14 and record the song from line 88. The recorder 14 will now stay on the record the entire three minute song being received at the input line 18.

Assume now that immediately after the end of the three minute song a commercial is broadcast which is less than 60 seconds, e.g. of 45 seconds duration. Between the end of the three minute song and the start of the commercial there is a very short pause causing the output of the pause detector 16 on line 20 to go low. Then, when the commercial starts, the output pulse on line 20 again goes high and the commercial is fed to the delay 86 over the input line 18. At the start of this commercial, the multivibrator 22 again is triggered to activate the timer 26 and increment the address counter 46 by 1 to produce a new address to location 2 of memory 44. Simultaneously, the multivibrator 90 is triggered to activate the tone encoder 92 and, thereby, to record a tone pulse on the tape 132 in parallel with the commercial which is also being recorded on the tape 132.

Then, after 45 seconds, with the timer 26 producing a logic 0 on line 28, the pulse on line 20 goes low to trigger the multivibrator 42. In the manner already described, gate 76 will be enabled when the flip-flop 58 is clocked to produce a high output Q on line 56 to trigger the multivibrator 72 to enable the memory 44 and to enable gate 50 to address the memory 44 at location 2. Also, the write pulse is produced on line 84. Thus, at this time a logic 0 is written into the memory 44 at memory location 2.

As can be appreciated, the commercial is recorded on the tape 132 after the end of the three minute song. When the start of this commercial is then played back over the line 88, the tone decoder 102 detects the corresponding tone pulse to trigger the multivibrator 100 and increment the address counter 98 by one to a new count corresponding to the address for memory location 2 where the logic 0 was stored. Thereafter, at the end of the pulse on line 104, multivibrator 118 is triggered, ultimately resulting in the enabling of gate 122 and gate 110, and the triggering of the multivibrator 72 in the manner described above. Consequently, at this time, with a memory read pulse being generated on line 84, the logic 0 at memory location 2 is read from memory 44 onto line 96 to switch off the recorder 14. Thus, while the commercial is being played back over the line 88 to the recorder 14, the latter is switched off so as to not record this unwanted audio signal.

Assume now that after the end of the 45 second commercial, another song having a 5 minute duration is being broadcast and being received on the input line 18. Again, at the start of this audio signal, the output of pause detector 16 on line 20 goes high to trigger the multivibrator 22 to activate the timer 26 and increment the counter 46 to a new address corresponding to memory location 3. Thereafter, at one minute into the song of 5 minutes' duration, multivibrator 42 is triggered, ultimately resulting in a logic 1 on line 28 being written into the memory 44 at the address location 3.

After the two-minute delay produced by the delay 86, the start of the 5-minute song is played back over line 88 and detected by the tone decoder 102. Consequently, address counter 98 is incremented to produce a new address corresponding to memory location 3. Therefore, the logic 1 stored at this memory location 3 is read out over the line 96 to turn on the recorder 14. Thus, the 5-minute song will be recorded on the recorder 14 immediately after the 3-minute song previously recorded.

As can be appreciated from the above, a recording of only desired signals such as music can be made on the recorder 14 merely by switching on the control apparatus 10. Any signal of less than 60 seconds' duration will not be recorded on the recorder 14. Thus, commercials less than 60 seconds' duration will not be recorded, and neither will, for example, the speech of a radio disc-jockey. This is because normally there are pauses in speech such that each speech signal is very much shorter than 60 seconds and therefore will not be recorded on recorder 14. Furthermore, the control apparatus 10 can be manufactured using state-of-the-art integrated circuit technology. This means the apparatus 10 can be installed or originally manufactured on tape cassette audio systems for an automobile, whereby the vehicle driver merely has to turn on the apparatus 10 and record music of a program being received by the car radio onto the tape cassette.

The delay 86 produces as one example the two-minute delay for the following reason. The control apparatus 10 is predetermined to wait one minute before a decision is made as to whether the particular input signal being received on line 18 is music or a commercial. Thus, such a particular input signal must be delayed at least one minute to be able to make the decision to record or not to record this signal. A time lag of two minutes may be selected to give the apparatus 10 more than adequate time in which to make the decision before this signal is outputted on line 88 and recorded or not recorded.

It also may be noted that in the specific delay shown, i.e., the tape recorder 130, the record head 140 and playback head 144 are positioned such than an input signal on line 18 can be simultaneously recorded and played back. For example, for a song of three minutes duration, and with a two-minute loop delay by tape 132, the beginning portions of the song can be played back via head 144 while recording the last minute portions of the song via head 140. Also, the spacing between the head 140 and head 144 is such that the head 140 can record such last minute portions over the beginning portions since the latter will have been played back via head 144.

The two-minute delay has additional significance relating to the bit capacity of memory 44. For example, when the control apparatus 10 is turned on, for the first two minutes data bits will be only written into memory 44 and not read from memory 44. This is because no signal will yet be produced on output line 88 or output line 106 due to the two minute delay. During this first two minutes, the disk jockey may be speaking, which can result, as mentioned above, in extremely short audio signals of, for example, 1000 in number, each less than 60 seconds. For these two minutes, control apparatus 10 makes a decision as to record or not record each of these short audio signals, resulting in 1000 data bits that must be written into memory 44. If the pause detector 16 is made to have a minimum pulse duration of, for example, 0.1 seconds on line 20, then the maximum number of data bits needed for the two minute delay before the head 140 can record over previously recorded signals is 120C, which therefore can be the capacity of memory 44. In the above example, 1000 data bits of logic 0 will be written into memory 44 corresponding to the short audio signals before the first of these bits is read from memory 44. Thereafter, as additional audio signals are being received on input line 18, data bits will be alternately written in and read from memory 44.

Furthermore, because of the continuous loop recorder 130 and the fact that counter 46 and counter 98 will automatically return to 0 after counting to capacity, the control apparatus 10 can continue on indefinitely, being limited only by the recording capacity of recorder 14.

While not specifically described, FIG. 2 shows in dotted lines the components of a "master clock" for the control apparatus 10. The "master clock" synchronizes the control apparatus 10 to perform the above-mentioned functions including alternately writing and reading data bits from memory 44.

Other aspects, objects and advantages of this invention can be obtained from a study of the drawings, the disclosure and the appended claims.

I claim:

1. A system for processing an audio input signal having wanted first audio signals of any time duration greater than a predetermined duration and having unwanted second audio signals of any time duration up to the predetermined duration, comprising:
- (a) a recorder for recording the first signals;
- (b) a pause detector for detecting the start of the first and second signals and for generating timing pulses having a duration proportional to the duration of the first and second signals;
- (c) timer means, responsive to the timing pulses, for generating first data bits of one level for a time up to the predetermined duration and for generating second data bits of another level after the predetermined duration;
- (d) first address counter means, responsive to the timing pulses, for generating first memory addresses;
- (e) first means, responsive to the end of the timing pulses or the second data bits, for generating first enabling pulses;
- (f) recorder delay means for delaying the input signal having the first and second signals a duration greater than the predetermined duration;
- (g) encoder means, responsive to the timing pulses, for adding start signals to the first and second signals being delayed to identify the start of the first and second signals;
- (h) decoder means for decoding the start signals added to the first and second signals being delayed;
- (i) second address counter means, responsive to the decoded start signals, for generating second memory addresses;
- (j) second means, responsive to the decoded start signals, for generating second enabling pulses;
- (k) a memory;
- (l) master clock means for enabling said memory in response to the first enabling pulses up to the predetermined duration to write the data bits of said timer means into said memory in response to the first addresses, and thereafter for alternately enabling said memory in response to the first enabling pulses and the second enabling pulses to read out the data bits stored in said memory in response to the first addresses and the second addresses; and
- (m) switch means, responsive to the data bits read out from said memory, for turning on and off said recorder.

2. Apparatus to control the recording of an input signal on a recorder, the input signal having first signals and second signals, each of the second signals being of a time duration up to a predetermined maximum and each of the first signals being of any time duration greater than the predetermined maximum, comprising:
- (a) means, responsive to the input signal, for automatically distinguishing the first signals from the second signals as a function of time duration; and
- (b) means, connected to said automatically distinguishing means for producing recorder control signals to activate a recorder in order to record each of the first signals and to deactivate the recorder to prevent recording of the second signal;

said automatically distinguishing means further including timing means responsive to the start of each of the first signals and the second signals for generating one data signal for the predetermined maximum time duration and for generating another data signal after the predetermined maximum time duration lapses and means for storing each one data signal and each other data signal;

said producing means including means for generating marking signals identifying the start of each of the first signals and the second signals and means responsive to the marking signals for controlling said storing means to output the one data signal and the other data signal as recorder control signals.

3. Control apparatus according to claim 2 wherein said means for generating marking signals comprises:
- (a) delay means for delaying the input signal a duration greater than the predetermined maximum duration;
- (b) tone encoder means for producing tone signals identifying the start of each of the first signals and second signals and being delayed the duration greater than the predetermined maximum duration; and
- (c) tone decoder means, responsive to the delayed tone signals, for producing tone decoded signals as the marking signals.

4. Control apparatus according to claim 2 wherein said means for storing and said means for controlling further comprise master clock means for alternately enabling said storing means to write in the one or the other data signal corresponding to a present first or second signal of the input signal and to read out a stored one or the other data signal corresponding to a previous first or second signal of the input signal.

5. An automatic editor for making a recording on a recorder of wanted first signals from an input signal having the first signals and unwanted second signals, each of the second signals being of a time duration up to a predetermined maximum and each of the first signals being of any time duration greater than the predetermined maximum, comprising:
- (a) means for distinguishing the first signals from the second signals as a function of time duration and for generating one data bit identifying the first signals and another data bit identifying the second signals;
- (b) means for delaying the input signal having the first and second signals for a predetermined time period and for adding to the start of the first and second signals start signals to provide delayed start signals;
- (c) a data bit storage memory;
- (d) means for writing the one data bit and the other data bit for each of the first and second signals into said memory;
- (e) means for detecting the delayed start signals; and
- (f) means, responsive to the detected start signals, for reading the stored one data bit and other data bit from said memory to activate a recorder in order to record each of the first signals and to deactivate the recorder to prevent recording of the second signal.

6. An automatic editor according to claim 5 wherein said means for reading comprises:
- (a) address counter means for generating addresses to said memory to access the stored data bits corresponding to the delayed first signals or second signals; and
- (b) means for enabling said memory.

7. An automatic editor according to claim 5 wherein said means for delaying and for adding comprises a tape recorder having a continuous looped tape for continuously recording and playing back the first and second signals.

8. An automatic editor according to claim 5 wherein said means for distinguishing comprises:
   (a) a pause detector for generating a pulse at the start of each of the first and second signals, the pulse having a width proportional to the duration of each of the first and second signals; and
   (b) timing means, responsive to the pulse, for counting for the predetermined maximum time duration and having one state corresponding to the one data bit subsequent to the predetermined maximum time duration and another state corresponding to the other data bit prior to the predetermined maximum time duration.

9. An automatic editor according to claim 8 wherein said means for writing comprises means, responsive to the end of the pulse corresponding to the second signals or the change of state of said timing means, for enabling said memory.

10. An automatic editor according to claim 9 wherein said means for writing further comprises address counter means for generating memory addresses to said memory to store each of the one data bit and the other data bit.

* * * * *